UNITED STATES PATENT OFFICE.

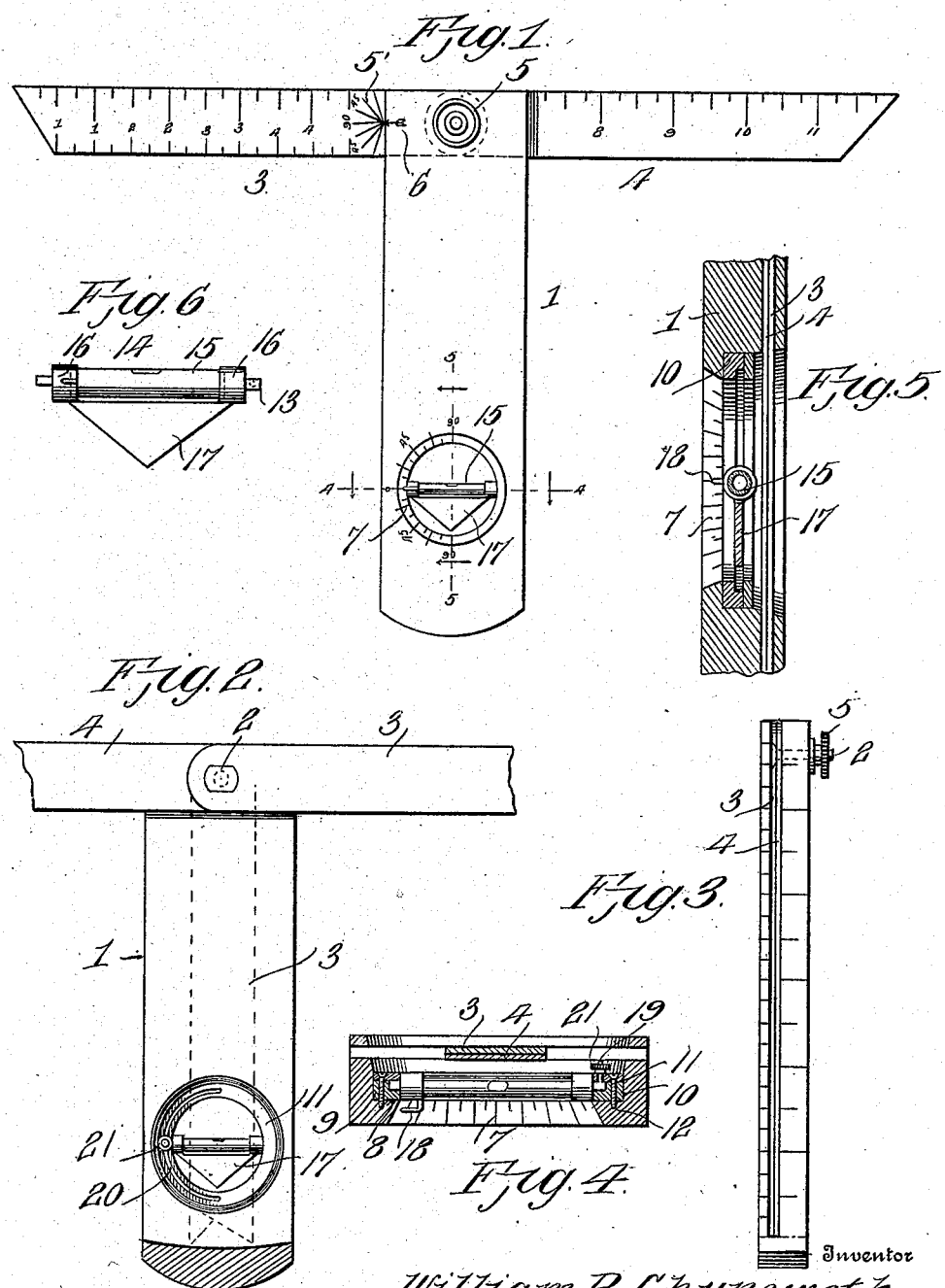

WILLIAM R. CHYNOWETH, OF PAINESDALE, MICHIGAN.

COMBINED MEASURING INSTRUMENT.

No. 905,054.  Specification of Letters Patent.  Patented Nov. 24, 1908.

Application filed March 10, 1908. Serial No. 420,219.

*To all whom it may concern:*

Be it known that I, WILLIAM R. CHYNOWETH, a citizen of the United States, residing at Painesdale, in the county of Houghton and State of Michigan, have invented new and useful Improvements in a Combined Measuring Instrument, of which the following is a specification.

This invention relates to combined rule, square, miter-bevel and level, and the object of the invention is to provide a device of this character which is adapted for measuring and ascertaining angles in either horizontal or vertical planes, for measuring and squaring objects, for forming bevels, and many other such uses.

With these objects in view the invention resides in providing a rectangular body member with a rotary weighted sight glass provided with an index finger coöperating with a scale of angles and having means whereby it may be locked in any desired position, and in providing the body member with graduated arms, said arms being pivotally connected with the body member and being provided with a scale of angles adapted to coöperate with an index line provided upon the body member, whereby the arms and body may be employed as a square or protractor.

With these and other objects in view the invention resides in the novel construction of elements and their arrangement in operative combination, hereinafter fully described and claimed.

In the drawings, Figure 1 is a side elevation of an instrument constructed in accordance with my invention. Fig. 2 is a similar view looking from the opposite side with back side of body piece removed. Fig. 3 is an end view of the instrument, showing the arms folded. Fig. 4 is an enlarged sectional view upon the line 4—4 of Fig. 1. Fig. 5 is a similar view upon the line 5—5 of Fig. 1. Fig. 6 is a detail elevation of the sight glass.

In the accompanying drawings, the numeral 1 designates the rectangular body member of my improved instrument. This body member 1 has its edges provided with suitable graduations to correspond with the inch or metric system. The body 1 is provided at its upper end with a suitable perforation adapted for the reception of a threaded element 2, by which a pair of arms 3 and 4 are connected with the body 1, and secured at any desired angle thereto by a milled nut 5 engaging the threaded element 2. The arms 3 and 4 are provided with suitable graduations, corresponding with the inch or metric system as may be desired, or the upper edges of the arms may be provided with one of the systems and the lower edge with the other system of graduation. The arms 3 and 4 may be provided with a circular radiating angle scale 5', coacting with an index 6 upon the body 1, and whereby various degrees of angles may be readily obtained. The members 3 and 4 may have their outer ends slanting at any desired angle, preferably 60° and 45° respectively, whereby these angles may be readily obtained by simply placing either the arm 3 or 4 upon the object on which the angle is to be scribed. The arms 3 and 4, are adapted, when not employed as a square or protractor, to be folded within the body member 1, as illustrated in Fig. 2 by the dotted lines.

The body 1 is provided with a circular opening near its lower end, and the walls of this opening are arranged at a suitable bevel and adapted for the reception of suitable angle graduations 7. The inclined wall upon which I provide the graduations 7 is preferably of a thickness lesser than half the thickness of the body portion 1, and is provided with a vertical wall 8, terminating in a right angular wall 9 near the ends or edges of the body 1. The opening provided by the walls 8 and 9 is preferably cylindrical, and adapted for the reception of an L-shaped ring 10, having a suitable collar 11. The L-shaped ring 10 and the collar 11 are both provided with suitable alining openings, adapted for the reception of retaining elements 12, by which they are secured upon the walls 8 and 9 of the body 1. The opening provided between the L-shaped ring and the collar 11 is adapted for the reception of the pintles or bearings 13 of a sight glass 14. This sight glass 14 comprises a glass member 15 positioned within suitable collars 16, upon which are positioned the bearings 13, and the collars 16 are provided with, or are integrally connected with a depending weight member 17. The outer faces of the collars 16 are adapted to bear against the inner faces of the ring 10 and the collar 11, while the bearings 13 are positioned within the central opening formed by the ring 11 and ring 10. The collar 16 upon one side of the sight glass 15 is provided with an index finger 18, adapted to coöperate with the graduations 7 upon the beveled face of the annular opening provided by the body 1. The bearing 13 upon the opposite side of the sight glass is provided with a right angular screw threaded projection 19, adapted to operate in an annular slot 20 provided within the collar 11, and to receive a milled nut 21, by which the glass 15 may be retained at any desired angle in relation to the body 1.

While I have described the preferred embodiment of my invention as it now appears to me, it is to be understood that minor details of construction, such as fall within the scope of the following claims, may be resorted to without departing from the spirit or sacrificing any of the advantages of my device.

Having thus fully described the invention what is claimed as new is:

1. In an instrument of the class described, a body having pivoted arms and an annular opening having an inclined wall provided with graduations, an L-shaped ring upon the body, a weighted sight having bearings upon the L-shaped ring, a threaded projection upon one of the bearings, a collar having a semi-circular recess adapted to engage the threaded projection and the L-shaped ring, a retaining nut for the threaded projection, and an index finger upon the sight glass coacting with the graduations of the inclined wall of the annular opening.

2. In a device of the character described, a sight glass provided with collars having projecting lugs and connected together by a weighted element, an index finger upon one of the collars and a threaded projection provided with a nut upon one of the lugs.

In testimony whereof I affix my signature in presence of two witnesses.

WILLIAM R. CHYNOWETH.

Witnesses:
JOSEPH CHYNOWETH, Jr.,
JOSIAH CARNE.